United States Patent

Boultinghouse

[15] 3,645,297
[45] Feb. 29, 1972

[54] MULTIPLE ADJUSTMENT VALVE

[72] Inventor: A. C. Boultinghouse, 17533 Dearbourn Street, Northridge, Calif. 91324

[22] Filed: Mar. 30, 1970

[21] Appl. No.: 23,905

[52] U.S. Cl. ................................................137/637.3
[51] Int. Cl. .................................................F16k 11/10
[58] Field of Search ....................137/637.3, 637.4; 251/25

[56] References Cited

UNITED STATES PATENTS 3,190,312   6/1965   Classen et al. .................137/637.4 X
3,351,095   11/1967  Harvey et al. ..................137/637.4 X Primary Examiner—Henry T. Klinksiek
Attorney—Lindenberg, Freilich & Wasserman

[57] ABSTRACT

A valve for sinks and other applications which allows setting of water temperature and volume, in addition to enabling on-off actuation. The valve includes a housing with hot and cold water inlets, and a cartridge which is installed in the housing and which contains all of the mechanisms for controlling temperature, volume and on-off states. The entire cartridge can be turned to regulate the relative amounts of water from the hot and cold water inlets that can flow through a main passageway in the cartridge to the valve outlet. The main passageway of the cartridge includes a valve seat, and a diaphragm that can move towards and away from the seat to close and open the valve. A volume regulator controls the rate of flow when the valve is on, by limiting the distance that the diaphragm can move away from the valve seat. Every time the valve is opened or closed, a control passageway formed in the diaphragm is swabbed by a needle, so that a small control hole can be utilized without the likelihood of becoming obstructed, the use of a small hole reducing the likelihood of water hammer.

14 Claims, 8 Drawing Figures

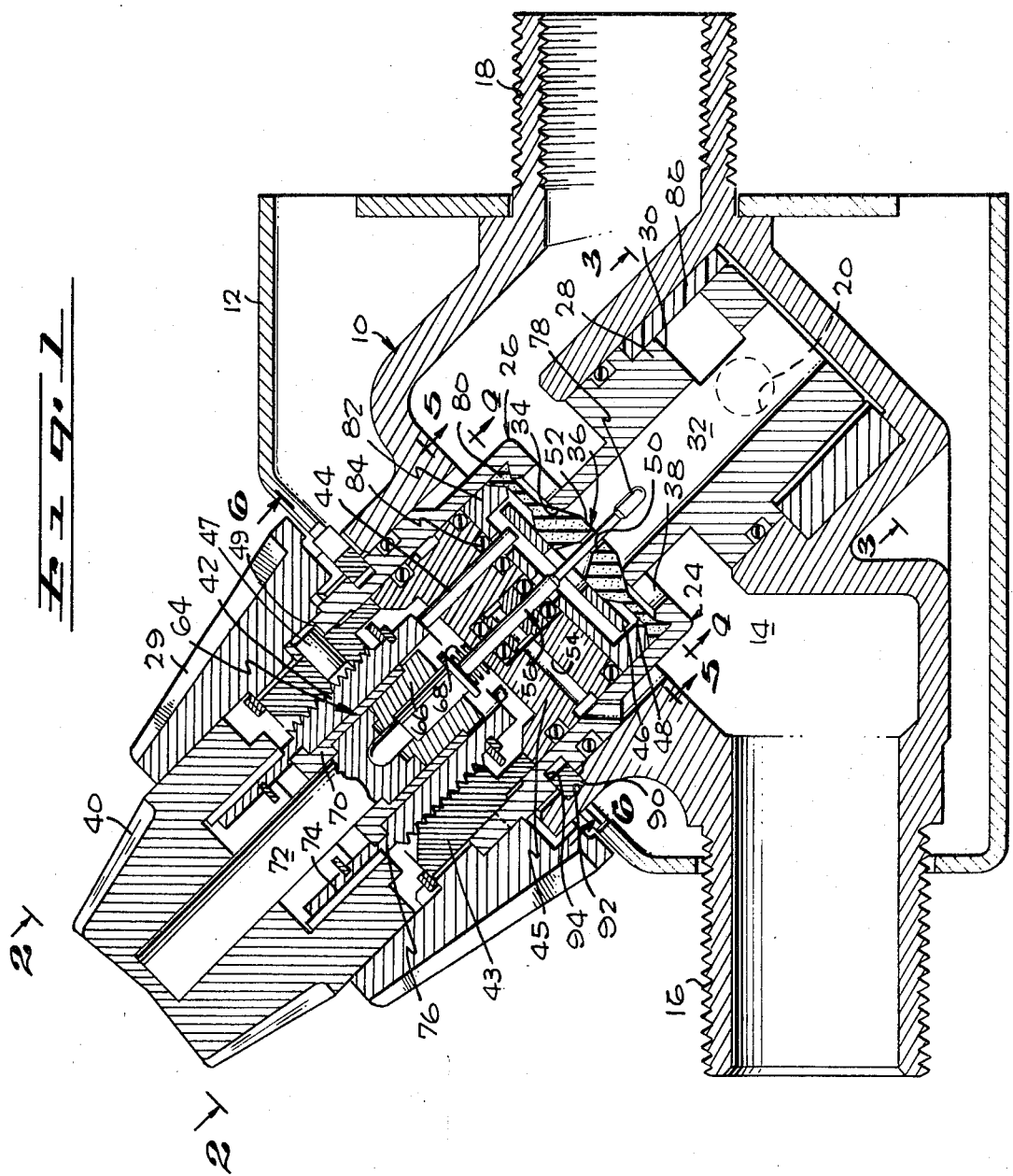

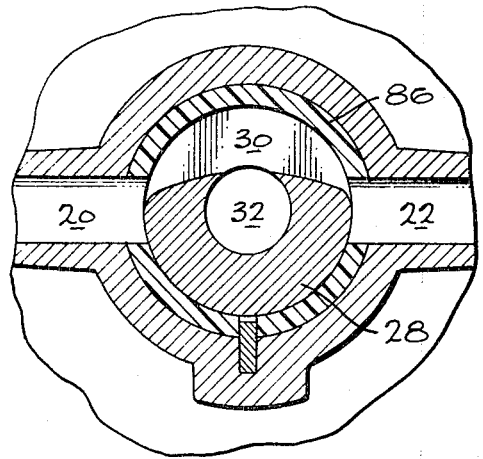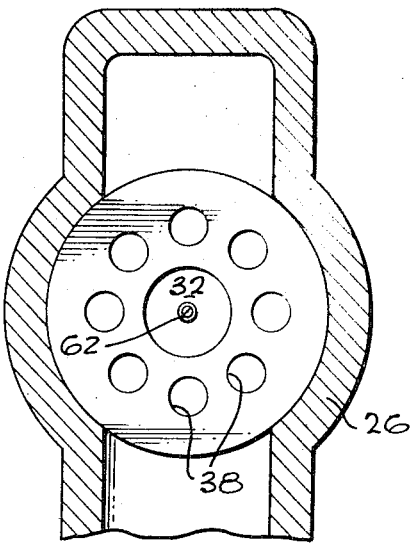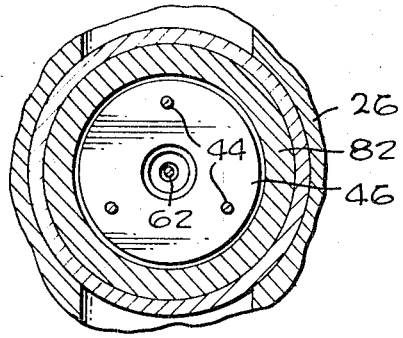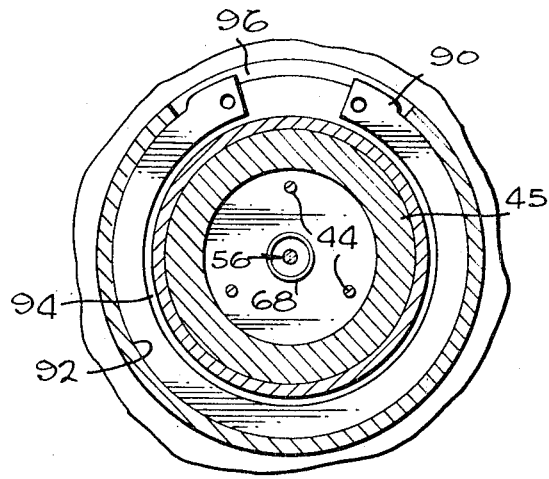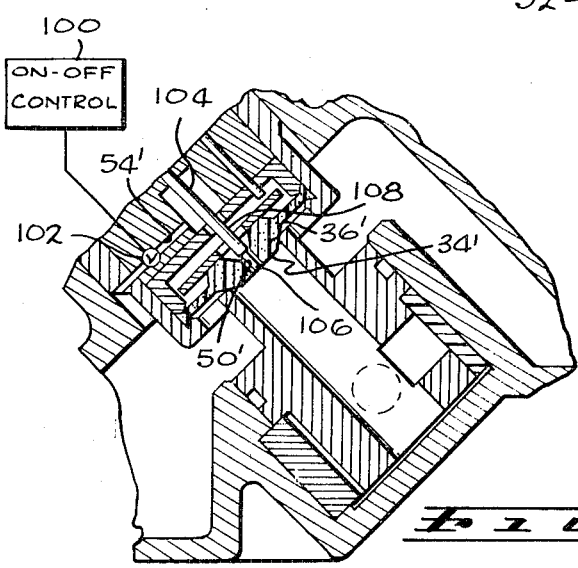
INVENTOR.
A. C. BOULTINGHOUSE
BY Lindenberg & Freilich
ATTORNEYS

3,645,297

MULTIPLE ADJUSTMENT VALVE

BACKGROUND OF THE INVENTION

1. Field of the Invention

This invention relates to valves.

2. Description of the Prior Art

Older type kitchen sinks had one valve for regulating the flow of cold water and another for regulating the flow of hot water. Modern sinks often employ one valve which regulates only temperature and another which regulates only volume. Often, the temperature and volume controls have been separately mounted on a main housing, so that several parts had to be individually removed from the main housing in many types of repairs or overhauls.

In many cases, it would be desirable to add an instant on-off control to a kitchen faucet arrangement, so that a predetermined temperature and volume setting could be quickly commenced or terminated. This would also eliminate annoying dripping that can occur if only a volume control is provided and it is not turned off completely. Such on-off devices could be installed by merely adding an on-off valve in series with the volume control, but this would generally result in a cumbersome structure. Furthermore, many types of on-off valves are highly subject to water hammer.

OBJECTS AND SUMMARY OF THE INVENTION

An object of the present invention is to provide an valve structure which permits temperature and volume control, wherein the moving mechanisms are contained in a single cartridge that can be removed and replaced from the valve housing as a unit.

Another object is to provide a valve of minimum complexity, that permits adjustment of fluid flow in addition to permitting rapid on-off action.

Yet another object of the invention is to provide an on-off valve mechanism of the type which utilizes pressure of the fluid to control valve action, which is resistant to water hammer.

In accordance with one embodiment of the invention, a relatively simple and compact valve is provided which permits adjustment of water temperature and volume, as well as permitting rapid on-off action. The valve includes a main housing with hot and cold water inlets and an outlet, and a cartridge that can be readily installed in the valve to control water flow from the inlets to the outlet. The cartridge has an outer cartridge housing which can be turned in the main housing to regulate the proportion of water from the hot and cold water inlets that can flow through a main passageway to the outlet. A valve seat and diaphragm are positioned along the main passageway, the diaphragm being flexible to move against and away from the seat to close and open the valve. The diaphragm has a hole that permits water to flow behind the diaphragm to keep it closed, until a bleedoff passageway is opened to relieve water pressure on the back side of the diaphragm. A volume regulator threadably mounted within the outer cartridge housing, can be turned to regulate the distance to which the diaphragm can deflect away from the valve seat, to thereby regulate the volume of flow.

The bleedoff, which controls the on-off states of the valve, is changed from a closed to an open position every time a pushbutton is operated by the user to extend or retract a needle. The needle has a swabbing portion that moves through the hole in the diaphragm when the needle is retracted. Thus, the diaphragm hole is repeatedly cleaned out during normal use and a small hole can be used without the likelihood of clogging. The use of a small hole reduces water surges and therefore reduces the likelihood of water hammer.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a valve constructed in accordance with the present invention;

FIG. 3 is a sectional view taken on the line 3—3 of FIG. 1;

FIG. 4 is a sectional view taken on the line 4—4 of FIG. 1;

FIG. 5 is a sectional view taken on the line 5—5 of FIG. 1;

FIG. 6 is a sectional view taken on the line 6—6 of FIG. 1; and

FIG. 7 is a simplified partial sectional view of a valve constructed in accordance with another embodiment of the invention, which employs remote control of the on-off function.

DESCRIPTION OF THE PREFERRED EMBODIMENTS

Figure 1A:
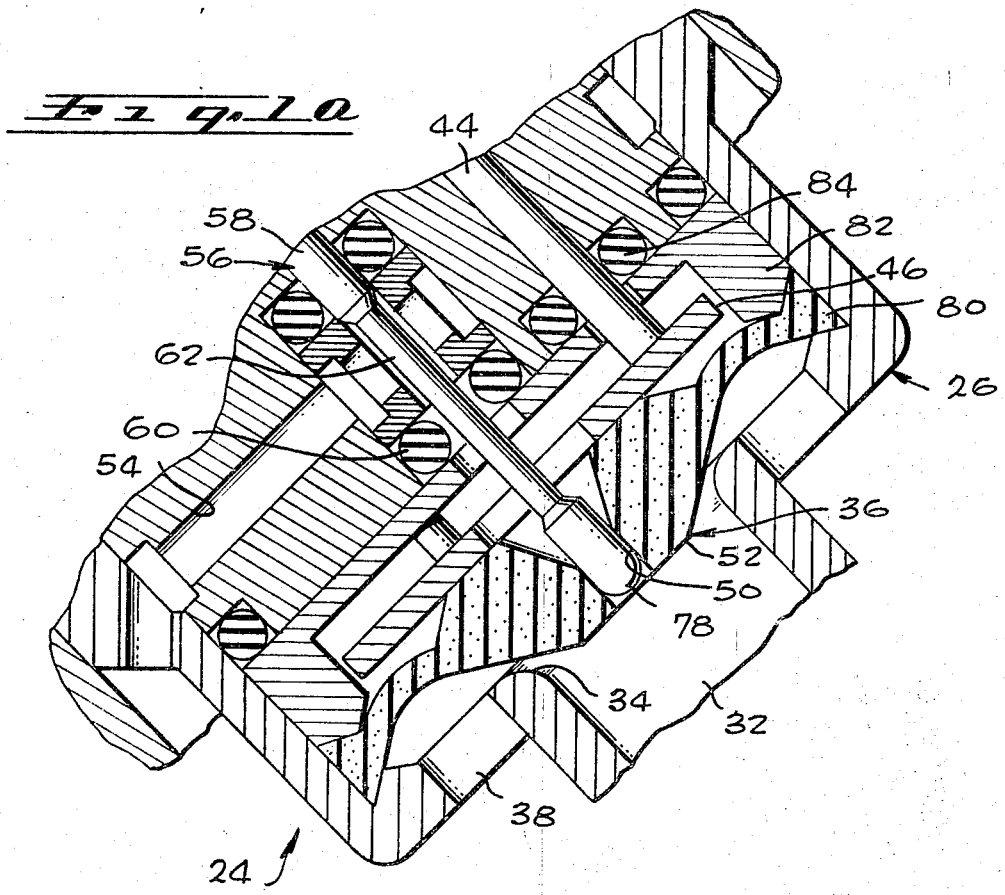
FIG. 1a is a partial sectional view showing the valve of FIG. 1 in an open configuration.
Figure 2:
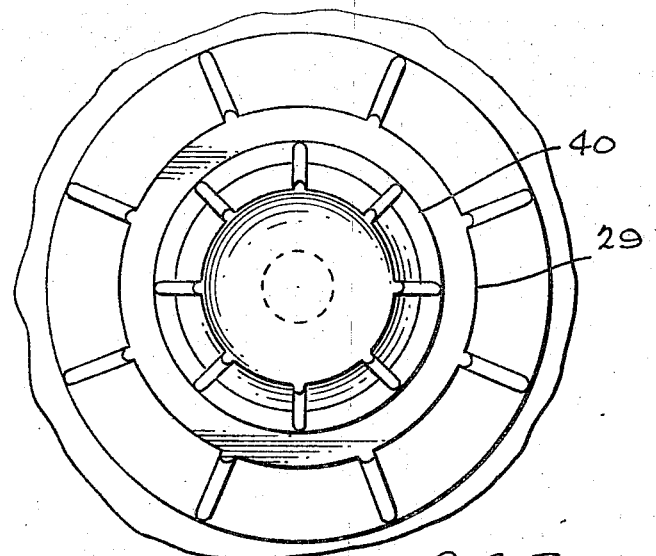
FIG. 2 is a view taken on the line 2—2 of FIG. 1.

As shown in FIG. 1, the valve includes a main housing 10 which can be installed on a sink and covered by a decorative plate 12. The housing has a common outlet region 14 that leads to two nipples 16, 18 that can be connected to a spout and hose, respectively. The housing has hot and cold water inlets 20, 22 (See FIG. 3) which can be coupled to hot and cold water pipes for carrying water from these pipes to the outlet 14. A cartridge 24 which is received in the main housing 10 includes mechanisms for controlling the temperature, volume, and on-off state of the valve.

The cartridge 24 includes an outer cartridge member or housing 26 that is rotatably mounted in the main housing 10. A temperature-regulating portion 28 formed in the cartridge housing has a recess 30 that can communicate wit the hot and cold water inlets 20, 22, the effective sizes of the communicating openings depending upon the rotational position of the temperature-regulating portion. Thus, if the regulating portion 28 is turned clockwise in FIG. 3, then more water is admitted through the cold water inlet 22 and less is admitted through the hot water inlet 20, to provide colder water at the outlet. A person can turn the entire cartridge to regulate water temperature by turning a knob 29 fixed to the outer cartridge housing 26 by interference press fitting, the knob 29 and the knob-receiving portion of the cartridge housing having mating splines to prevent relative turning. Water passing through the recess 30 continues through a main passageway 32 towards the outlet region 14.

The control of the amount of water flowing through the valve is regulated by walls defining a valve seat 34 and by a diaphragm 36 that serves as a valve-closing member movable against and away from the valve seat 32 to open and close the flow of water to the outlet region 14. It may be noted that water passing by the valve seat 36 can move through several holes 38 to reach the outlet region 14.

The diaphragm 36 is constructed of flexible material, such as Neoprene, which enables its center portion to readily flex towards and away from the valve seat 34. The distance to which the center of the diaphragm 36 can move away from the valve seat 34 governs the volume of fluid passing to the outlet region 14. A knob 40 can be turned to turn a volume control bushing 42 that is threadably mounted within a nutlike member 43 that is held to the outer cartridge housing 26, to advance the bushing 42 towards or away from the diaphragm. The nutlike member 43 is held against turning and sliding by a pin 47 that is received in a hole 49 of the housing 26. The bushing abuts three rods 44 which are slidably mounted in a passage member 45. The rods 44 can abut a washer 46 that contacts a rear surface or back side of the diaphragm 36. The bushing 42 therefore moves the three rods 44 towards and allows them to move away from the diaphragm to fix the maximum distance to which the diaphragm can move away from the valve seat 34, and therefore to control the amount of water flow when the valve is open.

The valve is maintained in a closed position by back water pressure applied to the back side 48 of the diaphragm 36. A control passageway or hole 50 in the diaphragm allows water from the inlet side of the main passageway 32 to be applied to the back side of the diaphragm. The backside 48 of the diaphragm has a greater normal area than the portion of the forward side 52 which faces the inlet water pressure, and therefore the water pressure produces a net force tending to keep the diaphragm closed against the valve seat 34. However, if the water pressure at the back side 48 of the diaphragm is relieved, the pressure at the forward side 52 will deflect the diaphragm away from the valve seat and allow the valve to open.

Relieving the pressure on the back side 48 of the diaphragm to open the valve is accomplished through a bleedoff passageway 54 in the bypass member 45, which allows water to drain from the back side of the diaphragm to the outlet area 14. A needle 56 which is slidably mounted within the cartridge, can block or open the passage of water from the back side 48 of the diaphragm to the bleedoff passageway 54. The needle 56 has a wide diameter region 58 which passes downwardly through a small O-ring 60 when the valve is to be shut, to block the passage of water to the bleedoff passageway 54. However, when the needle 56 is moved upwardly so that a narrow region 62 thereof is disposed within the O-ring 60, then water can flow from the back side 48 of the diaphragm past the O-ring 60 to the bleedoff passageway 54, to relieve pressure on the back side of the diaphragm. The diaphragm then moves away from the valve seat 34 and the valve is in its open state.

Movement of the needle 56 is accomplished by a push mechanism 64 of the type commonly employed in ball point pens to alternately extend and retract the writing tip when a pushbutton is depressed. The mechanism includes a rotary member 66 which limits the upward movement of the needle by a compressed spring 68, a catch tube 70 which engages corresponding catches on the rotary member 66, and a pushbutton 72 which can push in the rotary member 66. This type of push-operated retracting and extending mechanism is well known in the ball point pen art, and therefore will not be described in detail herein. The mechanism operates so that inward pressing of the pushbutton 72 alternately extends the needle 56 to the position shown in FIG. 1 and retracts it to a position wherein the narrow region 62 of the needle is located within the O-ring 60. If desired, a push mechanism of the type which also requires pulling can be used instead. As mentioned above, retraction of the needle allows water to pass through the O-ring to relieve pressure from the backside of the diaphragm 36 and cause the valve to open, while extension of the needle causes the valve to close.

The handle 40 is press fitted onto the pushbutton 72 so that pushing of the handle 40 depresses the pushbutton 72 to turn the valve on and off. The handle 40 is also coupled to the volume control bushing 42 by splines 74 formed on the inside of the handle that are received in recesses 76 at the upper end of the volume control bushing 42. Thus, the handle 40 can be turned to rotate the bushing 42 to vary the volume of fluid that flows during the on state, the handle 40 also being coupled to the pushbutton 72 so that it can be pushed to change the valve between the on and off states. In the configuration shown in FIG. 1, the valve is in an off state, and the handle 40 is in a primarily inward position. The next time the handle 40 is pushed down, it will move upwardly to a higher position.

The valve is constructed so that the control passageway 50 in the diaphragm is repeatedly swabbed out to keep it clean. When the valve is in an off state, as shown in FIG. 1, the narrow portion 62 of the needle 56 extends through the control passageway 50 in the diaphragm 36. The needle also has an enlarged outer end 78. When the needle 56 is moved upward to turn on the valve, the greater diameter outer end 78 lies within the control passageway 50. Thus, the outer end 78 of the needle passes into the control passageway 50 every time the valve is turned on. The passage of the end 78 swabs out the control passageway 50 to free it of any foreign material which has been deposited therein. As a result, the clearance between the outside of the narrow needle region 62 and the walls of the diaphragm at the control passageway 50 can be small so that the control passageway has only a small opening and only a small flow of water can pass therethrough. Such a small opening can be employed without the likelihood of clogging because of the repeated swabbing action during normal use. The advantage of a small control passageway is that surges of water through it are held to a minimum, and this greatly reduces the likelihood of water hammer. It also may be noted that the location of the enlarged end 78 in the control passageway 50 when the valve is opened, limits the flow of water to the backside of the valve 48 to a very small trickle. This allows even a small bleedoff passageway 54 to be effective in relieving pressure on the back side of the diaphragm.

The valve employs many O-rings to seal against the leakage of water. However, no O-ring is required to seal the periphery of the diaphragm 36 against the leakage of water from its back side 48 to the outlet holes 38. Prevention of leakage is assured by the construction of the peripheral portion 80 of the diaphragm. The peripheral portion 80 is wedge-shaped so that the extreme rim is wider than regions immediately inward of it. This causes the pressure of water on the back side of the valve to tend to expand the wedge portion 80 and seal it tightly against the outer cartridge 26 and against a retainer 82 that holds the diaphragm in place.

When the handle 40 is turned to increase volume, and the valve is later turned on, the three rods 44 must quickly move upwardly, being pushed up only by the deflecting diaphragm which pushes on the washer 46. Some friction is encountered in the sliding movement of the rods 44, because O-rings 84 are employed to prevent the leakage of water past the rods into upper regions of the valve mechanism. In order to keep the frictional force to be overcome to a minimum, narrow diameter rods 44 are utilized, which therefore can be sealed by small diameter O-rings.

The temperature regulating portion 28 of the lower end of the outer cartridge housing 26 rotates within an elastomeric liner 86, as also shown in FIG. 3. The liner 86, which may be constructed of an elastomeric material such as Neoprene, prevents metal-to-metal contact between the temperature-regulating portion 28 and the walls of the main housing 10 at the inlets 20, 22. Where metal-to-metal contact is employed, residues in some types of water that build up at the contacting surfaces, cause excessive wear. The walls 88 of the recess 30 which pass across the inlet openings are rounded to eliminate discontinuities. The continuous curve between the radially outer walls of the regulating portion 28 and the recess 30, helps prevent pinching of the elastomeric liner 88 around the inlet openings, and therefore reduces the possibility of damage to them.

The cartridge 24 can be installed substantially as a single unit into the main housing 10 of the valve. In order to hold it in place, a retainer ring 90 is employed, which is received in corresponding grooves 92 and 94 formed in the main housing 10 and outer cartridge housing 26. As shown in FIG. 6, the main housing is provided with an access slot 96 which extends to the extreme upper end of the main housing, to permit reception of the retainer 90. In order to install the cartridge, the retainer 90 is first installed in the cartridge housing slot 94. The cartridge, without the temperature knob 29, is then pushed into the main housing 10 of the valve while the separated ends of the retainer 90 are squeezed together with a special tool. When the cartridge housing has reached its proper depth, the retainer 90 is allowed to expand into the groove 92 of the main housing 10. The temperature knob 29 is then installed by pressing it on the outer cartridge housing 26. Removal of the cartridge is accomplished in the reverse manner. Thus a defective valve mechanism can be quickly changed by replacing the entire cartridge as a unit.

As shown in FIG. 1, the valve contains several additional O-rings and pins for sealing the valve against the outflow of water and for retaining the part in place. Most of these additional parts are used in a conventional manner readily apparent from the FIGURE, and therefore are not described in detail.

Thus, the invention provides a valve of compact and efficient design which permits versatile control of water flow in sinks, lavatories, and a variety of other applications. The valve combines a temperature-regulating mechanism, volume-regulating mechanism, and on-off mechanism in a single cartridge that can be installed or removed as a unit from a main valve housing. The combination of on-off switching, and volume control during the on state, is accomplished in a compact mechanism by employing a valve-closing member (the diaphragm) which is held against or away from a valve seat by control of bleedoff pressure at the back side of the member, and by a threaded member which can be turned to limit the maximum distance of the valve-closing member from the valve seat. A minimum of turning friction is required to vary the volume, while assuring good sealing, by employing narrow diameter pins that couple the threaded bushing to the diaphragm. A control passageway which couples the two sides of the valve closing member or diaphragm is repeatedly swabbed, so that a narrow diameter opening can be employed to reduce water hammer. The swabbing is accomplished by a needle portion which substantially completely blocks the control passageway when the valve is on, so that bleedoff from the back side of the diaphragm is facilitated. The flexible diaphragm is constructed to assure good sealing around its periphery. A boot is employed at the temperature-regulating portion of the valve to prevent metal-to-metal contact, and the temperature control portion is constructed to avoid discontinuities that might damage the boot.

FIG. 7 illustrates another embodiment of the invention, similar to the embodiment of FIG. 1, except that a remote on-off control 100 is employed, instead of a pushbutton mechanism. The on-off control 100 is a switch which sends current to a solenoid operated valve 102 in the bleedoff passageway 54' of the valve. This valve has a needle 104 which does not move, but which still serves to swab out the control passageway 50' in the diaphragm 36'. The needle 104 has a narrow outer end 106 and a wider portion 108. When the diaphragm 36' is in the closed position shown in FIG. 7, the walls of the control passageway 50' are disposed about the narrow needle portion 106. However, when the bleedoff valve 102 is opened to relieve back pressure on the diaphragm, and the diaphragm then deflects away from the valve seat 34' to open the valve, the walls of the control passageway 50' are then disposed about the enlarged needle portion 108. Thus, every time the valve is opened, the small control passageway 50' is swabbed out. The movement of the walls of the control passageway 50' is generally not as great as the movement of a needle valve in the embodiment of FIG. 1. However, the diaphragm can deflect enough so that the entire passageway 50' is swabbed out, and therefore a narrow passageway can be employed to reduce the possibility of water hammer. It also may be noted that when the valve is opened, the control passageway 50' is substantially plugged by the enlarged portion 108 of the needle, so that there is very little flow of water to the backside of the diaphragm and the bleedoff passageway can easily relieve pressure on the back side of the diaphragm.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A valve comprising:
a main housing having hot and cold water inlets and an outlet;
a cartridge housing for reception in said main housing to turn therewithin, said cartridge housing having a temperature control portion adjacent to said hot and cold water inlets and a main passageway for carrying water from said inlets to said outlet, said temperature control portion turnable with said cartridge housing to alter the proportion of water passing into said main passageway from said hot and cold water inlets, and said cartridge housing having means defining a valve seat along said main passageway;
a closing member;
means for mounting said closing member adjacent to said valve seat, to resist rotation of said closing member relative to said valve seat while permitting movement of at least a portion of it against and away from said valve seat;
volume regulator means including a volume regulator member threadably mounted within said cartridge housing for advancing toward and away from said valve seat to control the distance of said closing member from said valve seat;
a first handle coupled to said cartridge housing to enable manual turning to control temperature; and
a second handle coupled to said volume regulator member to enable manual turning to control volume.

2. The valve described in claim 1 wherein:
said closing member comprises a flexible diaphragm with a front side facing said main passageway and a back side opposite said front side, said diaphragm having a hole in it for carrying water to its back side; and including
means defining a bleedoff passageway for carrying water away from the back side of said diaphragm;
bleedoff passageway control means activatable to block and unblock said bleedoff passageway; and
means coupled to said second handle for activating said bleedoff passageway control means by linear motion of said second handle.

3. The valve described in claim 2 including:
swabbing means coupled to said means for activating said bleedoff passageway control means, for passing through said hole in said diaphragm to swab it.

4. The valve described in claim 1 wherein:
said closing member comprises a flexible diaphragm with a front side facing said main passageway and a back side opposite said front side, said diaphragm having a hole in it; and including
a passage member mounted within said cartridge housing, said passage member having walls defining a bleedoff passageway coupled to fluid at the back side of said diaphragm, and said passage member having a plurality of apertures therethrough with seals therearound; and
said volume regulator means includes a plurality of rods extending through said apertures to couple said valve regulator member to said diaphragm.

5. In a valve with a housing, which employs a valve-closing member movable against and away from a valve seat to control the flow of a fluid from an inlet region to an outlet, the improvement comprising:
means disposed in said valve housing for carrying fluid at said inlet region to a back side of said valve-closing member opposite said inlet region, to employ fluid pressure to tend to keep said valve closed;
bleedoff means coupled to the region at the back side of said valve-closing member and operable to open and close the outflow of fluid at the back side of said valve-closing member;
on-off control means coupled to said bleedoff means for operating said bleedoff means to open and close said valve; and
volume control means including means disposed in said valve housing for limiting the distance of said valve-closing member away from said valve seat to vary the amount of fluid flow when the valve is open.

6. The improvement described in claim 5 wherein:
said valve control means includes a first member having a plurality of apertures with fluid seals therein, a threadably mounted member positioned on a side of said first member opposite said valve-closing member for turning to move toward and away from said valve-closing member, and a plurality of narrow diameter rods extending through said apertures in said first member and in slidable contact with said fluid seals, to couple said threadably mounted member to said valve-closing member, whereby to permit narrow contact area dynamic seals.

7. A valve comprising:

a housing having inlet means and an outlet;

means defining a main passageway for coupling said inlet means to said outlet, including means defining a valve seat and a valve-closing member mounted for movement towards and away from said seat to close and open said main passageway;

shutoff means for alternating between a first state to maintain said valve-closing member tightly against said valve seat and a second state to allow said valve-closing member to move away from said valve seat, including a push mechanism coupled to said shut off means for alternating said states;

volume control means including a threadably mounted volume regulator for advancing towards and away from said valve seat to regulate the distance of said valve-closing member from said valve seat when said shutoff means is in said second state; and handle means coupled to said volume regulator to enable turning of said volume regulator for regulating the volume of flow when said shutoff means is in said second state, said handle means coupled to said push mechanism to enable slidable movement of said push mechanism to alternate the states of said shut off means.

8. The valve described in claim 7 wherein:

said inlet means includes means defining hot and cold fluid inlets;

said means defining a main passageway comprises a cartridge member pivotally coupled to said housing, said cartridge member having a portion disposed adjacent to said hot and cold fluid inlets to alternatively close one inlet to said main passageway while opening the other as said cartridge member is turned, and a knob coupled to said cartridge member to turn it; and said cartridge member has an internally threaded region, and said volume regulator is threadably mounted on said internally threaded region of said cartridge member.

9. In a valve for controlling the flow of fluid from an inlet to an outlet, which includes a valve-closing member movable against and away from a valve seat, means defining a control passageway for carrying fluid from the side of said valve-closing member which faces the inlet to the backside of the member, means defining a bleedoff passageway for carrying away fluid from the back side of the valve-closing member, and bleedoff passageway control means operable to open and close the bleedoff passageway to relieve or block the relief of pressure from the back side of the valve-closing member, the improvement comprising:

a swabbing member;

operating means coupled to said bleedoff passageway control means for operating it; and means coupling said operating means to said swabbing member for sliding said swabbing member at least partially through said control passageway at least some of the times when said bleedoff passageway control means is operated.

10. The improvement described in claim 9 wherein:

said means defining a control passageway comprises walls in said valve-closing member defining a hole in said member, said swabbing member extending at least partially through said hole.

11. The improvement described in claim 10 wherein:

said swabbing member has a first portion for sliding into said hole in said valve-closing member, and a second portion larger than said first portion, but small enough to slide into said hole in said valve-closing member said portions arranged so that said second portion is within said hole in said valve-closing member when said bleedoff passageway is open, whereby to impede fluid flow to the back side of said valve closing member when fluid is being drained away.

12. In a valve for controlling the flow of fluid from an inlet to an outlet, which includes a flexible diaphragm with a movable portion that can deflect against and away from a valve seat, said movable portion having a hole therein for carrying fluid from the side which faces the inlet to the back side of the diaphragm, means defining a bleedoff passageway for carrying away fluid from the back side of the diaphragm, and bleedoff passageway control means operable to open and close the bleedoff passageway to relieve or block the relief of pressure from the back side of the diaphragm, the improvement comprising:

a swabbing member extending at least partially through said hole in said diaphragm;

said swabbing member having portions of different cross sections over which said diaphragm moves as said movable portion of said diaphragm moves from a position against said valve seat to a position away from said valve seat.

13. The improvement described in claim 12 including:

operating means coupled to said bleedoff passageway control means for operating it; and means for coupling said operating means to said swabbing member to move said swabbing member through said hole in said diaphragm portion when said bleedoff passageway control means is operated.

14. A valve comprising:

a main housing having metallic walls forming a substantially cylindrical inlet region and hot and cold water inlets opening into said region, and said housing having an outlet;

a liner of elastic material extending within said substantially cylindrical inlet region and having holes therethrough aligned with said hot and cold water inlets;

a cartridge housing for reception in said main housing to turn therewithin, said cartridge housing having a temperature control portion wit substantially cylindrical outer walls disposed within said liner, a main passageway for carrying water to said outlet, and at least one recess extending radially from said substantially cylindrical outer walls to said main passageway, said temperature control portion turnable with said cartridge housing to alter the proportion of water passing into said main passageway from said hot and cold water inlets, and the walls of said temperature control portion defining a continuous smooth curve between the region of said cylindrical outer walls around said recess and the walls of said recess, so there is no sharp corner to pass across said liner where it forms holes leading to said inlets;

said cartridge housing having means defining a valve seat along said main passageway;

a closing member mounted for movement against and away from said valve seat;

volume regulator means including a volume regulator member threadably mounted within said cartridge housing for advancing toward and away from said valve seat to control the distance of said closing member from said valve seat;

a first handle coupled to said cartridge housing to enable manual turning to control temperature; and a second handle coupled to said volume regulator member to enable manual turning to control volume.

* * * * *